US005695813A

United States Patent [19]

Anchor et al.

[11] Patent Number: 5,695,813

[45] Date of Patent: Dec. 9, 1997

[54] LATEX COMPOSITION EMPLOYING SPECIFICALLY DEFINED ETHYLENE OXIDE/PROPYLENE OXIDE BLOCK COPOLYMER SURFACTANT AND HYDROPHOBIC DEFOAMING AGENT

[75] Inventors: Michael J. Anchor, Northville, Mich.; Rebecca P. Hollis, Flemington, N.J.; Gregory W. Drewno, Riverview, Mich.

[73] Assignee: BASF Corporation, Mount Olive, N.J.

[21] Appl. No.: 623,196

[22] Filed: Mar. 28, 1996

Related U.S. Application Data

[62] Division of Ser. No. 321,112, Oct. 11, 1994, Pat. No. 5,525,657.

[51] Int. Cl.[6] ........ B05D 1/12

[52] U.S. Cl. ........ 427/180; 428/500; 428/523

[58] Field of Search ........ 428/500, 523; 427/180

[56] References Cited

U.S. PATENT DOCUMENTS

| | | | |
|---|---|---|---|
| 3,862,078 | 1/1975 | Burke, Jr. | 523/335 |
| 3,879,326 | 4/1975 | Burke, Jr. | 523/319 |
| 3,892,700 | 7/1975 | Burke, Jr. | 523/335 |
| 3,892,701 | 7/1975 | Burke, Jr. | 523/326 |
| 3,892,702 | 7/1975 | Burke, Jr. | 523/319 |

OTHER PUBLICATIONS

"Poloxamer", *The United States Pharmacopeia –The National Formulary*, By the authority of the United States Pharmacopeial Convention, Inc. meeting at Washington, D.C., Mar. 22, 1985. Official from Jan. 1, 1990.

*Primary Examiner*—Kriellion S. Morgan

*Attorney, Agent, or Firm*—Burns, Doane, Swecker & Mathis, L.L.P.

[57] ABSTRACT

An improved latex composition is provided that has been found to exhibit a superior ability to form a substantially uniform polymeric film when applied to a substrate. The composition is capable of being handled and applied to a substrate in the absence of excessive foaming. The aqueous composition includes as essential components specified concentrations of a specifically-defined normally liquid predominantly hydrophobic nonionic ethylene oxide/propylene oxide block copolymer surfactant, and a solely hydrophobic defoaming agent (e. g., a hydrocarbon-based mineral oil). It is possible for the composition to be applied even to a hydrophobic substrate (e.g., a polyester film substrate). Compositions of the present invention, following application to a substrate and the volatilization of the water component, form a substantially uniform polymeric film that can serve as a coating or adhesive.

18 Claims, No Drawings

LATEX COMPOSITION EMPLOYING SPECIFICALLY DEFINED ETHYLENE OXIDE/PROPYLENE OXIDE BLOCK COPOLYMER SURFACTANT AND HYDROPHOBIC DEFOAMING AGENT

This application is a divisional of application Ser. No. 08/321,112, filed Oct. 11, 1994 now U.S. Pat. No. 5,525,657.

BACKGROUND OF THE INVENTION

The spontaneous generation of deleterious unwanted foam during the handling and application of polymeric latices to form a film upon a substrate has been recognized to lead to imperfections and concomitant nonuniformity in the resulting coating. Accordingly, it has been a common practice to also include a defoaming agent in such latices often in a substantial concentration. However, such defoaming agents have often been found to interfere with the wetting and coverage of the surface of the substrate by the latex composition and thereby to interfere with the formation of the desired continuous and uniform polymeric film upon the substrate once the water component is volatilized. It further has been a common practice to seek to remedy this deficiency in surface wetting and coverage through the further inclusion in the latex composition of an anionic surfactant. However, such anionic surfactants have been found commonly to increase the overall foaming propensity of the latex composition and to nevertheless contribute to the nonuniformity of the resulting film in spite of the best intentions of those seeking to apply a highly uniform polymeric film. It has been observed that such nonuniformity of the resulting polymeric film is particularly troublesome when the substrate that receives the latex composition tends to repel water and possesses a hydrophobic surface.

Commonly, polymeric latices are exposed to agitation or other high shear conditions at some point during handling and/or during application to a substrate (e.g., by spraying or the use of high speed transfer rolls) prior to the volatilization of the water component. Such conditions can lead to the production of copious quantities of foam that can adversely influence the character of the resulting polymeric film that is applied to a substrate. Where foam bubbles are present, the coverage of the substrate by the polymeric particles present in the latex composition tends to be hindered.

It is an object of the present invention to provide an improved latex composition for use in coating or adhesive end uses that exhibits a superior ability to form a uniform film upon a substrate.

It is an object of the present invention to provide an improved latex composition wherein the polymeric particles are present at a relatively high concentration and there is a good resistance to excessive foaming even if agitation or other high shear conditions are encountered.

It is an object of the present invention to provide an improved latex composition that can be applied to a substrate by spraying in the absence of excessive foaming.

It is an object of the present invention to provide an improved latex composition that has the ability to well wet and cover the surface of a substrate that is to receive a polymeric film to thereby facilitate uniform spreading in the absence of excessive foaming.

It is an object of the present invention to provide an improved latex composition that has the ability to well wet and cover the surface of a hydrophobic substrate that is to receive a polymeric film.

It is an object of the present invention to provide an improved latex composition wherein a defoaming agent is present in a relatively low concentration in conjunction with a relatively low concentration of a specifically defined nonionic surfactant that has been found through empirical research to yield a highly compatible overall composition that makes possible the formation of a substantially uniform film upon a substrate.

It is an object in a preferred embodiment of the present invention to provide an improved latex composition wherein the total surfactant concentration is relatively low and an anionic surfactant is absent.

It is a further object of the present invention to provide a latex composition that is particularly suited for forming a clear polymeric coating on a paper substrate.

It is a further object of the present invention to provide a latex composition that well forms a pressure-sensitive adhesive layer when applied to the surface of a hydrophobic polyester film substrate and the water component is volatilized.

It is another object of the present invention to provide a process for forming a substantially uniform polymeric film on a substrate while utilizing a latex composition in the absence of excessive foaming.

These and other objects and advantages of the presently claimed invention will be apparent to those of ordinary skill in the art from a reading of the following detailed description and appended claims.

Our companion patent application Ser. No. 321,103 entitled "Improved Latex Composition Employing Specifically Defined Alcohol Ethoxylate Surfactant and Hydrophobic Defoaming Agent" is being filed concurrently herewith.

SUMMARY OF THE INVENTION

It has been found that an improved latex composition suitable for coating or adhesive end uses which exhibits a superior ability to form a substantially uniform film upon a substrate in the absence of excessive foaming during handling and during application to a substrate consists essentially of:

(a) an aqueous dispersion medium, (b) approximately 40 to 60 percent by weight of discrete solid polymeric particles present in the aqueous dispersion medium formed by the polymerization of at least one ethylenically-unsaturated monomer, (c) approximately 0.25 to 1.5 (preferably approximately 0.75 to 1) percent by weight dissolved in the aqueous medium of a normally liquid predominantly hydrophobic nonionic ethylene oxide/propylene oxide block copolymer surfactant of the formula:

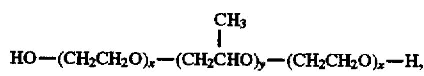

$$HO-(CH_2CH_2O)_x-(CH_2\underset{CH_3}{\overset{|}{C}}HO)_y-(CH_2CH_2O)_x-H,$$

having a molecular weight of approximately 1,100 to 9,000 (preferably approximately 3,000 to 6,000) where x is approximately 5 to 20 (preferably approximately 6 to 15) and y is approximately 40 to 90 (preferably approximately 50 to 70), and (d) approximately 0.05 to 1 (preferably approximately 0.25 to 0.5) percent by weight dispersed in the aqueous medium of a solely hydrophobic defoaming agent.

It has been found that a process for the application in the absence of excessive foaming of a substantially uniform polymeric film to a substrate comprises:

(a) applying to a substrate a layer of a latex composition consisting essentially of (i) an aqueous dispersion medium, (ii) approximately 40 to 60 percent by weight of discrete polymeric particles present in the aqueous dispersion medium formed by the polymerization of at least one ethylenically-unsaturated monomer, (iii) approximately 0.25 to 1.5 (preferably approximately 0.75 to 1) percent by weight dissolved in the aqueous medium of a predominantly hydrophobic nonionic ethylene oxide/propylene oxide block copolymer surfactant of the formula:

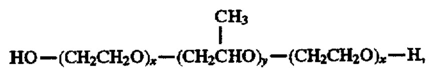

having a molecular weight of approximately 1,100 to 9,000 (preferably approximately 3,000 to 6,000) where x is approximately 5 to 20 (preferably approximately 6 to 15) and y is approximately 40 to 90 (preferably approximately 50 to 70), and (iv) approximately 0.05 to 1 (preferably approximately 0.25 to 0.5) percent by weight dispersed in the aqueous medium of a solely hydrophobic defoaming agent, and (b) removing water by volatilization from the layer of latex composition present on the substrate to form a substantially uniform polymeric film on the substrate that is suitable for use as a coating or adhesive.

DESCRIPTION OF PREFERRED EMBODIMENTS

The improved latex composition of the present composition incorporates approximately 40 to 60 (preferably 45 to 55) percent by weight of discrete solid polymeric particles formed by the polymerization of at least one ethylenically-unsaturated monomer in an aqueous dispersion medium. Such polymeric particles commonly are formed by emulsion polymerization in accordance with known technology. Representative polymeric particles include styrene-butadiene polymers, acrylic polymers, vinyl acetate polymers, vinyl chloride polymers, and mixtures of these. Particularly good results have been achieved when utilizing styrene-butadiene polymeric particles that are composed of approximately 25 to 45 percent styrene by weight. Polymeric particles of carboxylated styrene-butadiene polymers can be utilized. Preferred acrylic polymers include the copolymers of acrylonitrile, acrylic acid, methacrylic acid, butylacrylic acid, styrene, and mixtures of these. The solid polymeric particles that are dispersed in the aqueous medium commonly possess a number average particle size of approximately 0.05 to 3 microns, and preferably a number average particle size of approximately 0.1 to 0.5 micron.

When the latex composition is intended to form a protective or decorative coating upon a substrate, the polymeric particles commonly are selected which possess the ability to form a firm relatively nontacky layer upon solidification in accordance with known technology. When the latex composition is intended to form an adhesive layer (e.g., a pressure-sensitive adhesive) upon a substrate, the polymer particles commonly are selected which are inherently tacky following solidification or can be so rendered in accordance with known technology. Representative resins that optionally may be added to influence tackiness include alkylaryl hydrocarbon resins, glycerol esters of rosin, tall oil resins, etc.

A normally liquid predominantly hydrophobic nonionic ethylene oxide/propylene oxide block copolymer surfactant of the formula indicated hereafter is dissolved in the aqueous medium of the improved latex composition of the present invention in a relatively low concentration of approximately 0.25 to 1.5 percent by weight, and preferably in a concentration of approximately 0.75 to 1 percent by weight. Such specifically-defined nonionic surfactant possesses a molecular weight of approximately 1,100 to 9,000, and preferably approximately 3,000 to 6,000, and the formula:

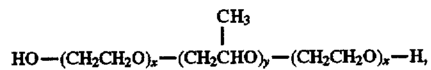

where x is approximately 5 to 20 and preferably approximately 6 to 15, and y is approximately 40 to 90 and preferably approximately 50 to 70. The nonionic surfactant is predominantly hydrophobic in the sense that more hydrophobic units on a molar basis are always present than hydrophilic units. Commonly such nonionic surfactant includes approximately 10 to 30 (e.g., 10 to 20) mole percent of recurring hydrophilic oxyethylene units and approximately 70 to 90 (e.g., 80 to 90) mole percent of recurring hydrophobic oxypropylene units. Such surfactants are known in the art and can be formed in accordance with the teachings of U.S. Pat. No. 2,674,619 that is herein incorporated by reference. Such formation reaction commonly involves the sequential addition of propylene oxide and then ethylene oxide to a an ethylene glycol molecule.

In particularly preferred embodiments, the nonionic surfactant as defined above possesses (a) a molecular weight of approximately 3,400 where x is approximately 5 to 6 and y is approximately 50, (b) a molecular weight of approximately 5,100 where x is approximately 15 and y is approximately 65 to 70, or (c) a molecular weight of approximately 5,650 where x is approximately 10 and y is approximately 85.

A solely hydrophobic defoaming agent is dispersed in the aqueous medium of the improved latex composition of the present invention in the relatively low concentration of approximately 0.05 to 1 percent by weight and preferably in a concentration of approximately 0.25 to 0.5 percent by weight. Such defoaming agent has been found to be highly compatible with the previously defined nonionic surfactant and when present in such relatively low concentration has been found to facilitate good wetting and coverage of a substrate with the latex composition of the present invention even if such substrate is hydrophobic in nature. The defoaming agent is considered to be solely hydrophobic in its molecular structure in the sense that it is hydrophobic throughout and for all practical purposes lacks a hydrophilic character at any portion of the molecule. Representative solely hydrophobic defoaming agents include hydrocarbon-based mineral oils; organosiloxanes (including emulsions of organo-modified polyfunctional polysiloxanes), metal soaps, etc. Fatty acids may be present with the hydrocarbon-based mineral oils. Also, silica particles having relatively sharp surfaces optionally may be present in conjunction with the solely hydrophobic defoaming agent. When silica particles are present with such defoaming agents, they serve primarily to puncture foam bubbles rather than to impart a hydrophilic character to the defoamer. In a particularly preferred embodiment, the solely hydrophobic defoaming agent is a hydrocarbon-based mineral oil having a boiling point of approximately 600° to 900° F.

In a preferred embodiment no anionic surfactant is present in the improved latex composition of the present invention. The absence of such anionic surfactant has been found to contribute to the ability of the composition to form a substantially uniform film upon a substrate in the absence of excessive foaming during handling and during application to a substrate.

Alternatively, other components optionally can be present in the latex composition of the present invention such as particulate inert fillers, colorants, glycols, thickeners, plasticizers, solvents, auxiliary resins, etc., so long as they do not modify the basic character of the composition. When forming a clear coating particulate fillers should be omitted as will be apparent to those skilled in the art.

The improved latex composition of the present invention can be applied to a wide variety of substrates. As previously indicated, good results are achievable even if the substrate is hydrophobic in nature. A decorative or protective coating can be readily applied to a substrate. Alternatively, the resulting uniform film that is applied to a substrate that can serve the role of an adhesive (e.g., a pressure-sensitive adhesive).

The improved latex composition can be applied to a substrate by conventional coating techniques without the necessity to minimize agitation in an effort to impede excessive foam formation. In a preferred embodiment, the latex composition is simply applied by spraying to form a uniform layer of the composition on a substrate, and the water component is removed by volatilization to form a substantially uniform polymeric film. Other representative techniques that can be utilized to form the layer on the substrate include the usage of a high speed transfer roller, the usage of a Byrd applicator, a Meyer bar, an air knife, a reverse roll, a reverse gravure, a die slot, etc. For instance, the layer of improved latex composition can be applied in a thickness of approximately 20 to 50 microns and dried to form a substantially uniform fill having a thickness of approximately 10 to 25 microns. The volatilization can be expedited through the application of heat in accordance with techniques known in the art for the specific polymeric particles of the latex that are selected. For instance, heating for 1 to 10 minutes at approximately 80° to 105° C. can be employed.

The following Examples are presented as specific illustrations of the present invention. It should be understood, however, that the invention is not limited to the specific details set forth in the Examples.

In the Examples that are presented hereafter various latex compositions were evaluated for their propensity to form foam, for their spreading ability when applied to a hydrophobic substrate, and for their propensity (or lack thereof) to form a film on a hydrophobic substrate that includes imperfections termed "fish eyes".

More specifically, the tendency of the latex composition to foam was evaluated through the use of a standard test procedure wherein a 300 ml beaker was completely filled with the latex composition, the net weight of the filled beaker was recorded as "A", the contents of the beaker were transferred to a Hobart mixer, the latex composition was agitated for 10 minutes in the Hobart mixer at a speed selected to produce substantial agitation in the absence of splattering, the 300 ml. beaker was again filled with a portion of the composition obtained from the Hobart mixer, and the net weight of the contents of the beaker including foam was recorded as "B". The percent foam was calculated while using the following formula:

Percent Foam=1−"B"/"A"×100.

The spreading ability of the latex composition was determined on the surface of a hydrophobic substrate that was represented by a polyester film. The latex was introduced by the use of a pipette to the space below a Byrd applicator in a quantity sufficient to cover the entire surface of the substrate, and next was applied to the substrate. The latex composition was drawn down to a thickness of approximately 25 microns through the use of the Byrd applicator that was pulled downward to distance of 8 inches. This spreading test was carried out in triplicate in each instance. Following drying the fills that were provided on the hydrophobic substrate had a thickness of approximately 12 microns and were evaluated according to their spreading ability and the presence or absence of imperfections known as "fish eyes" as previously stated.

The spreading ability was determined by visual observation with respect to general appearance of the resulting dried film. Each film was evaluated (a) for the possible presence of "edge creep" wherein the edges of the drawdown contract toward the middle of the test pattern, (b) for "orange peel" wherein the surface of the film is mottled in a random pattern, and (c) for the presence or absence of complete coverage. The following rating system for this spreading ability was utilized:

1=Poor,

2=Fair,

3=Good,

4=Very Good, and

5=Excellent.

The "fish eye" evaluation of the coating was also carried out by visual observation wherein the fill was examined for the possible presence of areas with no observable coverage by the polymeric particles of the latex. Such voids can range from tiny specks to large circular voids where there is little or no polymeric coverage. The observation of such "fish eye" voids was rated on the following scale:

1=Many,

2=Few, and

3=None.

EXAMPLE I

Latex compositions were formed while employing 50 percent by weight of styrene-butadiene polymeric particles consisting of approximately 26 percent by weight of recurring units derived from styrene in an aqueous dispersion medium. The styrene-butadiene particles were formed by emulsion polymerization and possessed a number average particle size of approximately 0.30 micron.

A normally liquid predominantly hydrophobic nonionic ethylene oxide/propylene oxide block copolymer surfactant having a molecular weight of approximately 3,650 of the previous formula where x is approximately 8 and y is approximately 50 was utilized in a concentration of approximately 0.5 percent by weight, and a hydrocarbon-based mineral oil defoaming agent was present in a concentration 0.5 percent by weight.

Following volatilization of the aqueous component a substantially uniform inherently tacky film was provided on the hydrophobic substrate that was suitable for service as a pressure-sensitive adhesive.

When evaluated in accordance with the prescribed procedures the latex composition yielded the following test results:

Percent Foam: 2.0 (Very Low)

Spreading Ability: 4 (Very Good)

Fish Eyes: 3 (None).

COMPARATIVE EXAMPLES

For comparative purposes it was found that when a like quantity of a commonly utilized anionic sodium dioctyl sulfosuccinate surfactant was substituted for the predominantly hydrophobic nonionic ethylene oxide/propylene oxide block copolymer surfactant and the mineral oil defoaming agent was omitted from the latex composition, that an excessive foaming value of 54.2 percent was observed. Such value would indicate the exhibition of excessive foaming during handling and during application to a substrate where high shear conditions are encountered. Also, when a like quantity of the mineral oil defoamer was added to this comparative composition, an excessive foaming value of 22.5 percent still was observed that well exceeded the value obtained in Example I.

EXAMPLE II

Example I was repeated with the exception that 1.0 percent by weight of the predominantly hydrophobic nonionic ethylene oxide/propylene oxide block copolymer surfactant was utilized in the latex composition there described instead of 0.5 percent by weight.

When evaluated in accordance with the previously described procedures, the latex composition yielded the following results:

Percent Foam: 1.2 (Very Low)

Spreading Ability: 4 to 5 (Very Good to Excellent)

Fish Eyes: 3 (None).

EXAMPLE III

Example I was repeated with the exception that the predominantly hydrophobic nonionic ethylene oxide/propylene oxide block copolymer surfactant had a molecular weight of approximately 5,650, x was approximately 10, and y was approximately 85.

When evaluated in accordance with the previously-described procedures, the latex composition yielded the following results:

Percent Foam: 6.4 (Low)

Spreading Ability: 4 to 5 (Very Good to Excellent)

Fish Eyes: 3 (None).

EXAMPLE IV

Example III was repeated with the exception that the predominantly hydrophobic nonionic ethylene oxide/propylene oxide block copolymer surfactant was provided in a greater concentration of 1.0 percent by weight and the mineral oil defoaming agent in a greater concentration of 1.0 percent by weight was provided in the latex composition.

When evaluated in accordance with the previously-described procedures, the latex composition yielded the following results:

Percent Foam: 1.3 (Very Low)

Spreading Ability: 5 (Excellent)

Fish Eyes: 3 (None).

EXAMPLE V

Example III was repeated with the exception that the predominantly hydrophobic nonionic ethylene oxide/propylene oxide block copolymer surfactant was provided in a greater concentration of 1.0 percent by weight and the mineral oil defoaming agent was provided in the same concentration of only 0.5 percent by weight in the latex composition.

When evaluated in accordance with the previously-described procedures, the latex composition yielded the following results:

Percent Foam: 4.0 (Low)

Spreading Ability: 5 (Excellent)

Fish Eyes: 3 (None).

EXAMPLE VI

Example I can be repeated with the exception that the latex composition includes 50 percent by weight of styrene-acrylic polymeric particles instead of styrene-butadiene polymer particles and is applied to a moving paper substrate by spraying. The polymeric particles were formed by emulsion polymerization and possess a number average particle size of approximately 0.30 micron. The latex is handled and is applied to the paper substrate in the absence of excessive foaming.

Following volatilization of the aqueous component a quality substantially uniform clear film coating is provided on the paper substrate.

Although the invention has been described with preferred embodiments, it is to be understood that variations and modification may be resorted to as will be apparent to those skilled in the art. Such variations and modifications are to be considered within the purview and scope of the claims appended hereto.

We claim:

1. A process for the application in the absence of excessive foaming of a substantially uniform polymeric film to a substrate comprising:

(a) applying to a substrate a layer of a latex composition consisting essentially of (i) an aqueous dispersion medium, (ii) approximately 40 to 60 percent by weight of discrete polymeric particles present in said aqueous dispersion medium formed by the polymerization of at least one ethylenically-unsaturated monomer, (iii) approximately 0.25 to 1.5 percent by weight dissolved in said aqueous medium of a predominantly hydrophobic nonionic ethylene oxide/propylene oxide block copolymer surfactant of the formula:

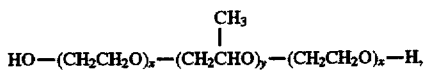

$$HO-(CH_2CH_2O)_x-(CH_2CH(CH_3)O)_y-(CH_2CH_2O)_x-H,$$

where x is within the range of approximately 5 to 20 and y is within the range of approximately 40 to 90, and (iv) approximately 0.05 to 1 percent by weight dispersed in said aqueous medium of a solely hydrophobic defoaming agent, and (b) removing water by volatilization from said layer of latex composition present on said substrate to form a substantially uniform polymeric film on said substrate that is suitable for use as a coating or adhesive.

2. A process for the application in the absence of excessive foaming of a substantially uniform polymeric film to a substrate according to claim 1 wherein said discrete solid polymeric particles have a number average particle size within the range of approximately 0.05 to 3 microns.

3. A process for the application in the absence of excessive foaming of a substantially uniform polymeric film to a substrate according to claim 1 wherein said discrete solid polymeric particles have a number average particle size within the range of approximately 0.1 to 0.5 micron.

4. A process for the application in the absence of excessive foaming of a substantially uniform polymeric film to a substrate according to claim 1 wherein said discrete solid polymeric particles were formed by emulsion polymerization.

5. A process for the application in the absence of excessive foaming of a substantially uniform polymeric film to a substrate according to claim 1 wherein said discrete solid polymeric particles are present in said aqueous dispersion medium in a concentration within the range of approximately 45 to 55 percent by weight.

6. A process for the application in the absence of excessive foaming of a substantially uniform polymeric film to a substrate according to claim 1 wherein said discrete solid polymeric particles are selected from the group consisting of styrene-butadiene polymers, acrylic polymers, vinyl acetate polymers, vinyl chloride polymers, and mixtures of the foregoing.

7. A process for the application in the absence of excessive foaming of a substantially uniform polymeric film to a substrate according to claim 1 wherein said discrete solid polymeric particles are a styrene-butadiene polymer and have a number average particle size within the range of approximately 0.1 to 0.5 micron.

8. A process for the application in the absence of excessive foaming of a substantially uniform polymeric film to a substrate according to claim 1 wherein, x is within the range of approximately 6 to 15, and y is within the range of approximately 50 to 70 in said predominantly hydrophobic nonionic ethylene oxide/propylene oxide block copolymer surfactant.

9. A process for the application in the absence of excessive foaming of a substantially uniform polymeric film to a substrate according to claim 1 wherein with respect to component (iii), x is within the range of approximately 5 to 6, and y is within the range of approximately 50 in said predominantly hydrophobic nonionic ethylene oxide/propylene oxide block copolymer surfactant.

10. A process for the application in the absence of excessive foaming of a substantially uniform polymeric film to a substrate according to claim 1 wherein with respect to component (iii), x is within the range of approximately 15, and y is within the range of approximately 65 to 70 in said predominantly hydrophobic nonionic ethylene oxide/propylene oxide block copolymer surfactant.

11. A process for the application in the absence of excessive foaming of a substantially uniform polymeric film to a substrate according to claim 1 wherein with respect to component (iii), x is within the range of approximately 10, and y is within the range of approximately 85 in said predominantly hydrophobic nonionic ethylene oxide/propylene oxide block copolymer surfactant.

12. A process for the application in the absence of excessive foaming of a substantially uniform polymeric film to a substrate according to claim 1 wherein said predominantly hydrophobic nonionic ethylene oxide/propylene oxide block copolymer surfactant is present in a concentration within the range of approximately 0.75 to 1 percent by weight.

13. A process for the application in the absence of excessive foaming of a substantially uniform polymeric film to a substrate according to claim 1 wherein said solely hydrophobic defoaming agent is selected from the group consisting of hydrocarbon-based mineral oils, organosiloxanes, metal soaps, and mixtures of the foregoing.

14. A process for the application in the absence of excessive foaming of a substantially uniform polymeric film to a substrate according to claim 1 wherein said solely hydrophobic defoaming agent is a hydrocarbon-based mineral oil having a boiling point within the range of approximately 600° to 900° F.

15. A process for the application in the absence of excessive foaming of a substantially uniform polymeric film to a substrate according to claim 1 wherein said solely hydrophobic defoaming agent is present in a concentration within the range of approximately 0.25 to 0.5 percent by weight.

16. A process for the application in the absence of excessive foaming of a substantially uniform polymeric fill to a substrate according to claim 1 wherein an anionic wetting agent is absent.

17. A process for the application in the absence of excessive foaming of a substantially uniform polymeric film to a substrate according to claim 1 wherein said substrate is paper, a filler is absent in said latex composition and said latex composition forms a clear polymeric coating on said paper substrate following the volatilization of the aqueous dispersion medium.

18. A process for the application in the absence of excessive foaming of a substantially uniform polymeric fill to a substrate according to claim 1 wherein said substrate is a hydrophobic polyester fill and said latex composition forms a pressure-sensitive adhesive when applied on the surface of said hydrophobic polyester fill following the volatilization of the aqueous dispersion medium.

* * * * *